United States Patent
Marilly et al.

(10) Patent No.: US 8,140,661 B2
(45) Date of Patent: Mar. 20, 2012

(54) LOCAL ASSURANCE MANAGEMENT DEVICE FOR AN EQUIPMENT ELEMENT IN A COMMUNICATION NETWORK

(75) Inventors: Emmanuel Marilly, Antony (FR); Stéphane Betge-Brezetz, Paris (FR); Olivier Martinot, Draveil (FR); Michel Chevanne, Clamart (FR); Gérard Delegue, Cachan (FR)

(73) Assignee: Alcatel Lucent, Paris (FR)

( * ) Notice: Subject to any disclaimer, the term of this patent is extended or adjusted under 35 U.S.C. 154(b) by 2735 days.

(21) Appl. No.: 10/809,521

(22) Filed: Mar. 26, 2004

(65) Prior Publication Data

US 2004/0193711 A1    Sep. 30, 2004

(30) Foreign Application Priority Data

Mar. 28, 2003    (FR) ...................... 03 03835

(51) Int. Cl.
*G06F 15/173* (2006.01)
(52) U.S. Cl. ...................... 709/224; 709/226
(58) Field of Classification Search .............. 709/224
See application file for complete search history.

(56) References Cited

U.S. PATENT DOCUMENTS

| | | |
|---|---|---|
| 6,085,243 A | 7/2000 | Fletcher et al. |
| 6,272,537 B1 | 8/2001 | Kekic et al. |
| 6,681,232 B1 * | 1/2004 | Sistanizadeh et al. ..... 707/104.1 |
| 7,925,750 B2 * | 4/2011 | McKinnon et al. ........... 709/225 |
| 2003/0005112 A1 * | 1/2003 | Krautkremer ................ 709/224 |

FOREIGN PATENT DOCUMENTS

FR    2 774 191    7/1999

OTHER PUBLICATIONS

L. L. Ho et al, "Real-Time Performance Monitoring and Anomaly Detection in the Internet: An Adapative, Objective-Driven, Mix-and-Match Approach", Bell Labs Technical Journal, Wiley, CA, vol. 4, No. 4, Oct. 1999, pp. 23-40, XP000902469.

* cited by examiner

*Primary Examiner* — Ario Etienne
*Assistant Examiner* — Blake Rubin
(74) *Attorney, Agent, or Firm* — Sughrue Mion, PLLC

(57) ABSTRACT

An installed device (D) is intented to local assurance management for a network element (NE) in a communication network (N) equipped with a network management system (NMS), where said equipment element (NE) presents a chosen configuration and contains means (MM) for the measurement of parameter values in the network as well as a management information base (MIB) which stores management data representing the measured values. The device or arrangement (D) includes management means (MAE) used to adapt the configuration of the equipment element (NE) in accordance with at least the management data stored in the management information base (MIB) and with chosen rules known as assurance rules.

33 Claims, 1 Drawing Sheet

Figure 1:
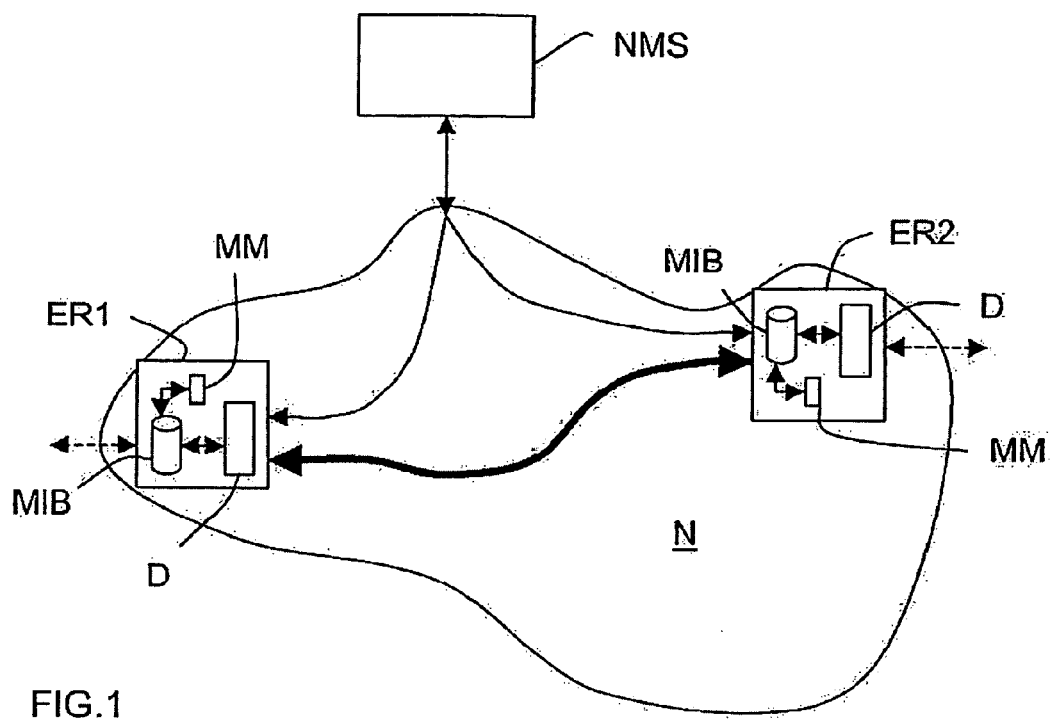

LOCAL ASSURANCE MANAGEMENT DEVICE FOR AN EQUIPMENT ELEMENT IN A COMMUNICATION NETWORK

The invention concerns communication networks, and more particularly those providing an assurance of the continuity of service(s).

Many communication networks implement assurance methods which monitor the execution of preventive and remedial maintenance activities, intended to assure their customers of continuity in the availability of services, defined in terms of quality of service (QoS). To this purpose, the networks have a network management system (or NMS) which continuously analyses the status of means and performance so as to anticipate or detect problems or breakdowns, and to determine the actions to be undertaken so that the customers should not be penalized.

Such centralized analysis is based upon the collection of a very large volume of data and alarms from the many items of network equipment used to perform the measurement of parameter values in the network, and more precisely in their management information bases (or MIBs), used to store the management data representing the measured values. Once collected, via a Simple Network Management Protocol (SNMP) collector for example, the data are stored in an archive management base of the Oracle type for example, and are fed into calculation modules which implement predefined formulae or equations.

Such a solution is described, for example, in the article entitled *"Real-Time Performance Monitoring and Anomaly Detection on the Internet: an Adaptive, Objective-Driven, Mix-and-Match Approach"* by L. Lawrence Ho, Christopher J. Macey and Ronald G. Hiller.

Such a centralized assurance method requires the use of management bases of very large capacity, substantial calculation time, and consumes passband (during collection), damaging the performance of the network.

Some attempts have been made toward the use of on-board agents in network elements, but the decisional aspects remain in a centralized member, and present the same defects as the previous solution. Moreover, these attempts do not concern the assurance issue.

Examples of such attempts can be found in American patents U.S. Pat. Nos. 6,272,537 and 6,085,243.

The object of the invention is therefore to improve the situation.

To this purpose, the invention proposes a local assurance device or arrangement for an equipment element in a communication network presenting a chosen configuration and including means for the measurement of parameter values in the network and a management information base (MIB) storing management data representing the measured values.

This device is characterized by the fact that it includes management means used to adapt the configuration of the equipment in which it is installed, with relation to, in particular, management data stored in its management information base and with chosen rules, known as assurance rules, defining a local assurance policy.

In other words, the invention consists of integrating, into equipment (or nodes) of the network, an inbuilt assurance device so as to be able to provide, locally, at least part of the assurance method managed by the NMS.

The inbuilt assurance device or arrangement, according to the invention, can include additional characteristics which can be taken separately and/or in combination, and in particular:

management means capable of adapting the configuration of their equipment with relation to the information data coming from at least one other network element, an adaptation consisting of a change to the parameter measurement policy and/or a change to the report transmission (or reporting) policy to the NMS, an adaptation consisting of a change to the method of operation of the equipment, management means including means for analyses of network parameters capable of delivering information data representing the evolution in time, over a chosen period, of certain parameter values in the network (such as the traffic or the status of a router, for example) which are stored in the MIB. In this case, the means used for the analyses can be arranged so as to deliver information data representing a trend analysis and/or an analysis of profiles or of signatures (or "baselines") and/or an analysis of discontinuity and/or an aggregation of network parameter values. In addition, these analysis means can be configurable, in particular with the aim of implementing fresh calculations with relation to the network parameters, transmitted by the NMS, management means including alarm means responsible for triggering the sending of an alarm and/or of information data to the NMS and/or to at least one other network element, in accordance with chosen assurance rules. Such information data and alarms are, for example, representative of the result(s) of analyses(s) or of data aggregation(s) effected by the analysis means and/or the value(s) of parameters of the network stored in the MIB. In addition, the alarm means can be configurable, management means wherein network observation means defining a flow measurement agent of the end-to-end type, and delivering information data. In this case, the means employed for observation of the network can be configurable, management means including means for the management of service level agreements (SLA) delivering information data. In this case, the means for the management of service level agreements (SLA) can be configurable, management means capable of performing tests of the active measurement type, or for assistance with troubleshooting for example. In particular, these tests can be used to feed back aggregated information or the result of the test (such as the time taken for an operation of the TCP type) at the level of the NMS layer, management means capable of guaranteeing their management tasks in accordance with a timetable, so that certain (or all) assurance or test functions are performed only on certain days of the week or of the month, or at certain times for example, management means including monitoring means, used to manage the operation (and in particular the configuration) of the analysis means, alarm means, network observation means and means for the management of service level agreements (SLA), in accordance with chosen assurance rules and the information data delivered by them. Such monitoring means can have the shape of a rule engine in which the chosen assurance rules are stored. In addition, these monitoring means can be configurable, configurable management means, management means and/or analysis means and/or alarm means and/or monitoring means and/or network observation means and/or means for the management of service level agreements (SLA) arranged so as to be capable of being configured by the NMS via an application programming interface (API) and possibly via the MIB. In this case, the MIB can be configured or programmed by the NMS via the API, management means and/or analysis means and/or alarm means and/or network observation means and/or means for the management of service level agreements (SLA) and/or monitoring means arranged so as to be capable of being configured by the NMS through dedicated commands such as those using the "Command Line Interface" (or CLI).

The invention also concerns a network element equipped with a device or arrangement of the type presented above. The invention is more particularly suited, though not in any restrictive way, to network equipment such as routers, switches and firewalls.

The invention also provides a communication network equipped with a network management system (NMS) and a large variety of network equipment of the type presented above. In one embodiment of the distributed type, each network element can be arranged so as to deliver alarms and/or information data of different types to the network management system.

In particular, the invention can be implemented in all network technologies which have to be managed, and in particular in networks (of the Wavelength-Division Multiplexing (WDM), Synchronous Optical NETwork (SONET), or Synchronous Digital Hierarchy (SDH) type for example) used for the transmission of data (of the Internet-IP or Asynchronous Transfer Mode (ATM) type for example) or of speech (of the conventional, mobile or Next Generation Network (NGN) type for example).

Figure 2:
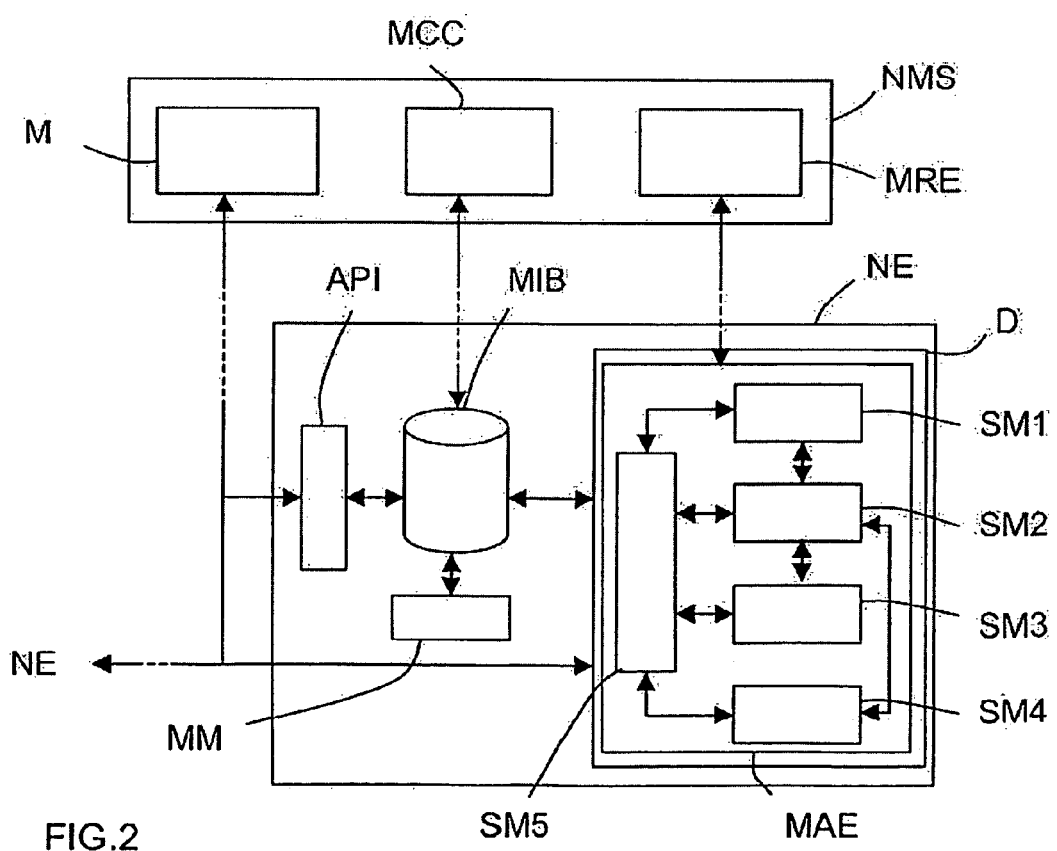

Other characteristics and advantages of the invention will appear on examination of the detailed description hereafter, and of the appended drawings, in which:

FIG. 1 schematically shows a communication network which includes a network management system (NMS) and network equipment according to the invention, and FIG. 2 schematically shows an example of implementation of a network element according to the invention.

The appended drawings can not only serve to complete the invention, but also contribute to its specification or description, as appropriate.

The purpose of the invention is to enable the local management, by means of the network equipment, of part of the assurance method operated by the network management system (NMS) of a communication network.

As shown on FIG. 1, a communication network (N) schematically includes a large variety of network equipment (Nei-where here i=1 or 2, but it can take any value), such as, for example, servers equipped with a firewall, switches, edge routers or core routers, capable of exchanging data, in accordance with a network management protocol, with a network management system, and in particular with its network management server (NMS).

Each equipment element (NEi) conventionally includes a management information base (MIB), also called an object instance base. Each MIB stores management data representing the values of information fields which characterize the associated equipment element (NEi). Certain of these information fields designate network parameters whose instantaneous values are measured by probes (MM) installed in, or controlled by, the equipment element (NEi). In addition, each MIB is associated with a management information base specification (not shown), also called an MIB specification, stored in the network management system and accessible to the network management server (NMS).

In what follows, it is considered, by way of a non-limited example, that the communication network (N) is of the Internet type (IP) and that the management protocol of the network is the Simple Network Management Protocol (SNMP-RFC 2571-2580). Of course, the invention also applies to other types of network, such as, for example, transmission networks of the WDM, SONET or SDH type, management networks of the ATM type, or speech networks of the conventional, mobile or NGN type, and to other network management protocols, such as TL1, CORBA or CMISE/CMIP, for example.

In addition, in what follows, it is considered that the network equipment elements (NEi) are edge (peripheral) routers acting as agents for observation of streams or flows of the end-to-end type. These routers are generally placed at the borders of the network and allow the establishment of links with other networks. These agents are generally intended to perform end-to-end measurements for scalability problems. But of course the invention is not limited to this type of network element. the inventions concerns all network equipment capable of exchanging management data with the NMS, and in particular the edge routers which do not act as observers, the core routers, the switches and the firewalls.

Each network element (NEi) is generally configured specifically so as to transmit to the NMS (or NMS layer) information data representing measurements which it has performed with its probe or probes (MM) and which it has stored in its MIB, as well as alarms signaling problems or breakdowns. The configuration is generally defined by one or more policies. As an example, a first policy relates to the reporting conditions for values measured by the equipment element (NEi) by means of its probes (MM). A second policy can concern the parameter measurements which the equipment element (NEi) must perform with its probe or probes (MM). A third policy can concern the method of operation of the equipment element (NEi). These policies are usually specified for each equipment element (NEi) using a configuration module (MC) of the NMS. They are transmitted to the equipment elements (NEi), via the network (N), by means of the management protocol (here the SNMP).

However, the NMS, and in particular its collector module (connector) (MCC), can also, when considered necessary, send requests to a network element (NEi) that it should transmits the values of some of the information fields which are stored in its MIB. This is known by the skilled in the art as "polling".

As shown more clearly on FIG. 2, the invention provides a local assurance management device (D) which is intended to be either installed in an equipment element (NEi) or incorporated into an external unit connected directly to an equipment element (NEi). In what follows, it is considered that the device or arrangement (D) is installed in an equipment element (NEi).

This device (D) according to the invention includes a local assurance management module (MAE) which is responsible for adapting the configuration of the equipment element (NEi) in which it is installed, in accordance with chosen rules known as assurance rules, the management data stored in its MIB, and any information data which it receives from other network equipment.

By "adapting" is meant here the modification of a parameter measurement policy (or even the introduction of a new measurement policy or re-configuration of the measurement policy) and/or a reporting policy to the NMS and/or the method of operation of the equipment element (NEi), initially specified by the configuration module (MC) of the NMS.

In addition, "assurance rules" here refer to rules which specify the local assurance policy of the equipment element, taking account of the values calculated by certain network parameters and stored in its MIB, or of external events, such as an action of the NMS layer or of another router.

The installed assurance module (MAE) thus allows the installation in an equipment element (NEi) of certain assurance functions so as to make them "more clever", to limit the volume of information which is passing through the network, and possibly to allow its partial reconfiguration in accordance with assurance rules.

In order to manage the assurance policy locally, the assurance module (MAE) preferably includes a first submodule (SM1) which is responsible for applying one or more processings to the values of certain information fields stored in the MIB. More precisely, these processes consist of applying formulae or equations, specified by the configuration module (MC) of the NMS, to the values of the chosen information fields, in accordance with dedicated assurance rules, in order to deliver information data.

For example, the first submodule (SM1) is responsible for performing trend analyses over a chosen interval (or following a predetermined timetable), which are useful in the anticipation of problems or breakdowns. In particular, it can point out that the percentage of use of a router CPU will reach a critical threshold in an hour, or that the passband of an LSP will exceed the selected threshold in two hours.

It can be also responsible for performing analyses of profiles or of signatures (or "baselines"). This is particularly useful, for example, when one is seeking to recognize or identify a characteristic usage profile, such as a specific attack on a router, or a billing method.

It can also be responsible for performing analyses of flow or traffic discontinuity. For example, in the event of overloading of a network, packets are dropped, so that the detection of a discontinuity in the drop parameter (from 0 to x) enables it to tell that one does indeed have dropped packets.

It can also be responsible for performing aggregations of network parameter values, to apply formulae of the data collection module (MCC) in the router for example, or for calculating an average value over a predetermined period (e.g. the average passband used during the last week). In this case, the aggregated values can be stored in the MIB, and can then be extracted from it as a result of a polling request issued by the collector (MCC) of the NMS.

As an illustrative example, the first submodule (SM1) can be responsible for estimating the forecast change (the trend) in the number of dropped packets, as well as the trend regarding the passband used and/or of the computing load (on the CPU) of the equipment element (NEi). It can also be arranged to perform tests, on active measurement(s) for example, or on troubleshooting assistance. In particular, these tests can be used to feed back aggregated information or the result of the test (the time taken for an operation of the TCP type, for example) at the level of the NMS layer.

Preferably the first submodule (SM1) delivers information data representing the result of its analyses (or assesments) to a (fifth) management submodule (SM5), which determines the actions to be undertaken in accordance with the local assurance policy of its equipment element (NEi).

The assurance module (MAE) also preferably includes a second submodule (SM2) which is responsible for triggering the sending of alarms and/or information data (or reports) on the orders of the fifth submodule (SM5), in accordance with assurance rules which are dedicated to it.

But one can also envisage that the first submodule (SM1) supplies the second submodule (SM2) with information data, so that it can apply certain of the assurance rules to the latter, and decide either to transmit them, or to send an alarm to the NMS and, more precisely, to an event reception module (MRE) and/or at least one other network element.

In the illustrated example of an edge router of the end-to-end type, the assurance module (MAE) also preferably includes a third submodule (SM3) which is responsible for observing the network, and in particular the traffic of the end-to-end type, in accordance with assurance rules which are dedicated to it. For example, there is an installed probe, for performing the end-to-end measurements. This installed probe is then configured so as to determine the flow to be examined, and the results of the measurements feed into dedicated assurance rules. For example, one of these rules can be: "if one measures two different streams between two edge routers, then one aggregates the measurement of the two streams in order to limit the calculation".

In this case, the third submodule (SM3) defines what the skilled in the art refers to as an end-to-end flow measurement agent.

Preferably, the third submodule (SM3) delivers information data representing the results of its observations (or measurements) to the fifth management submodule (SM5), which determines the actions to be undertaken in accordance with the local assurance policy of its equipment element (NEi). However, one could also envisage that the third submodule (SM3) supplies the second submodule (SM2) with information data, in order that it can apply certain of the assurance rules to the latter, and decides either to transmit them or to send an alarm to the NMS, and more precisely to the event reception module (MRE) and/or at least one other network element.

In addition, and as illustrated in FIG. 2, the assurance module (MAE) can include a fourth submodule (SM4) which is responsible for local management of certain service level agreements (SLA) in accordance with assurance rules which are dedicated to it. For example, the submodule (SM4) knows the service level agreement (SLA) of a customer, so that it can be responsible for checking whether this SLA is correctly observed, and. can generate an alarm (or information data) if this is not the case (or if the situation deteriorates).

Preferably, the fourth submodule (SM4) delivers information data representing management reports to the fifth submodule (SM5), which determines the actions to be undertaken in accordance with the local assurance policy of its equipment element (NEi). However one can also envisage that the fourth submodule (SM4) supplies the second submodule (SM2) with information data, so that it can apply certain of the assurance rules to these, and decide to transmit them or to send an alarm to the NMS, and more precisely to the event reception module (MRE) and/or at least one other network element.

As indicated several times above, the assurance module (MAE) includes a fifth submodule (SM5 or monitoring module) which is responsible for monitoring the operation of the other submodules (here SM1 to SM4). More preferably, this fifth submodule (SM5) should take the form of a rule engine in which all the assurance rules devoted to the other submodules are stored. This could be a "Java expert System Shell", for example.

While each submodule (SM1 to SM4) performs calculations and/or analyses and/or compiles reports determined on the basis of dedicated assurance rules, the fifth submodule (SM5) preferably manages all of said dedicated assurance rules. By "manages all of the rules" is meant here managing the conditions and the actions specified by the different rules.

More precisely, the fifth submodule (SM5) has two main functions.

A first function consists of telling the second submodule (SM2) to generate an alarm, or to send a report to the NMS layer (or to another equipment element in the network), because by applying an assurance rule to data delivered by one of the other submodules (SM1 to SM4), it is able to see that the corresponding condition has not been satisfied.

The fifth submodule (SM5) can also apply chosen assurance rules to information data coming from other network equipment (NEj). Indeed, an equipment element (Nej) can be responsible for transmitting values that it has measured and/or aggregated to another equipment element (NEi) equipped with a device or arrangement (D) responsible for processing these values so as to generate new information data which can then be fed back to the NMS or sent to another equipment element (NEj). them by the local assurance policy, or because the fourth submodule (SM4) has warned it that an SLA which it was operating locally had not been respected.

A second function consists of deciding on adaptation of the configuration of the equipment element (NEi), and in particular of the installed assurance module (MAE), in accordance with information data that it receives from the other submodules (SM1 to SM4) and with the assurance rules which determine the local assurance policy.

For example, taking account of the results of analyzing certain network parameters, supplied by the first submodule (SM1), the fifth submodule (SM5) can decide to modify its method of analysis or indeed to ask the second submodule (SM2) to send an alarm to the NMS layer so that it sends new analysis formulae. It can also decide to modify an analysis timetable effected by the first submodule (SM1), for example.

When the fifth submodule (SM5) decides to modify the operation (or the configuration) of one of the submodules (SM1 to SM4), it sends it the corresponding instructions, which corresponds to asking the SM5 to modify its calculations and/or analyses and/or reports. Similarly, when the local policy allows it, the fifth submodule (SM5) can be responsible for retroactively altering the configuration of the router via an installed reconfiguration module.

It is worth noting that the reconfiguration operations (operational changes) determined by the fifth submodule (SM5) are specified by the assurance rules of the local policy. In other words, all the fifth submodule (SM5) does is to order the execution of predefined actions.

The fifth submodule (SM5) can also apply chosen assurance rules to information data coming from other network equipment (Nej). Indeed, an equipment element (Nej) can be responsible for transmitting values that it has measured and/or aggregated to another equipment element (NEi) equipped with a device or arrangement (D) responsible for processing these values so as to generate new information data which can then be fed back to the NMS or s sent to another equipment element (NEj).

The local assurance policy can be defined as follows, for example:
  if the trend, estimated by the first submodule (SM1), of the number of dropped packets increases by more than 5%, then a trend alarm must be emitted,
  if the passband used, analyzed by the first submodule (SM1), remains below a first threshold, then the value of the passband used must be transmitted each day to the collector (MCC) of the NMS,
  if the passband used, analyzed by the first submodule (SM1), falls between a first and second threshold, then the average value of the passband used must be transmitted every hour to the collector (MCC) of the NMS,
  if the time period, estimated by the first submodule (SM1), required for the passband used to reach the second threshold is less than two hours, then a trend alarm must be emitted,
  if the computing load (on the CPU) of the equipment element (NEi), estimated by the first submodule (SM1), is greater than 80%, then trend analyses need no longer be performed,
  if the loss of packets, estimated by the first submodule (SM1), increases by 5%, then the size of the buffer memories must be increased by 5%.

In other words, the local assurance policy consists here, on one hand of transmitting the measurement of the passband each day if the behavior of the equipment element (NEi) is normal, but of activating trend analyses and increasing the frequency of report transmission if the behavior changes, and on the other hand of interrupting all the tasks involving a parameter if the value of this parameter becomes critical, and finally of modifying the internal operation of the equipment element (NEi), represented by a parameter, in accordance with any variation of said parameter.

It is preferable that the assurance module (MAE) should be configurable remotely over the network (N) by the configuration module (MC) of the NMS. More precisely, it is preferable that each submodule (SM1 to SM5) should be configurable. In fact this allows the operation of each submodule (SM) to be adapted remotely in accordance with circumstances, such as due to migration of the network (N), and/or in accordance with requirements, such as when the centralized assurance controller of the NMS needs to have the values of new parameters, or needs additional aggregated parameters or new actual or prospective analyses (transmission of new formulae or equations).

Two embodiments can be envisaged. A first method consists of transmitting the configuration data indirectly to the assurance module (MAE) via an application programming interface (API) installed in the equipment element (NEi), and possibly also via the MIB. This API interface can also, with advantage, allow the configuration module (MC) of the NMS to configure or program the MIB, so that it is not of the static type. In fact the assurance module (MAE) can cooperate with the MIB in order to configure itself, and to define new entries to the MIB, in order to be able to access these news entries. In this case, access is gained to the MIB via SNMP requests ("GET" and "SET"), thus allowing easy configuration (and even management of the rights and the security of the exchanges with SNMP 3); the MIB allows one to have a "normalized" interface due to the fact that its fields are accessible via well-defined object identifiers (OID). An object identifier refers here to an identifier that is the subject of an MIB variable that one wishes to retrieve. Such an identifier is generally normalized by the RFC 1213 standard for MIB II for example.

A second method consists of transmitting the configuration data directly to the assurance module (MAE) using dedicated commands, such as those from the "Command Line Interface" (or CLI).

The assurance module (MAE) can be created in the form of electronic circuits, of software (computer) modules, or a combination of circuits and software.

The invention is not limited to the embodiments of the local assurance management device and of the network element described above by way of example only, but also encompasses all of the alternatives which might be envisaged by the professional engineer in the context of the following claims.

Thus in the above document, we have described network equipment which is capable of locally managing the assurance process supervised by the NMS. However one can also envisage a distributed operation in which some at least of the network equipment is equipped with simplified local assurance management, enabling the transmission of alarms and/or specific and additional information data to an assurance server of the NMS. In this case of course, the network equipment remains capable of adapting its configuration in accordance with management data values stored in its MIBs.

In addition, we have described one embodiment in which the device or arrangement according to the invention was installed or located in the network element. However the device or arrangement according to the invention can also take the form of an external element installed in a unit connected directly to the network element.

The invention claimed is:

1. A local assurance management device for a network element in a communication network equipped with a network management system, where said network element presents a chosen configuration and comprises means for measuring parameter values in the network, and a built-in management information base used to store management data which are representative of said measured parameter values, wherein the device comprises management means which are arranged to adapt the configuration of said network element according to at least said management data stored in said management information base, and chosen rules, known as assurance rules, defining a local assurance policy, where said adaptation comprises a change to a measurement policy parameter and/or a change to a report transmission policy to said network management system.

2. A device according to claim 1, wherein said management means are arranged so as to adapt said configuration according to information data coming from at least one other network element.

3. A device according to claim 1, wherein said adaptation comprises a change to a method of operation of said network element.

4. A device according to claim 1, wherein said management means include analysis means arranged so as to determine, in accordance with certain of said chosen assurance rules, information data representing the changes in time, over a chosen interval, of parameter values in the network stored in said management information base.

5. A device according to claim 4, wherein said analysis means are arranged so as to deliver information data representing a trend analysis and/or an analysis of profiles or signatures and/or an analysis of discontinuity and/or an aggregation of network parameter values.

6. A device according to claim 4, wherein said analysis means are configurable.

7. A device according to claim 6, wherein said analysis means are arranged so as perform fresh calculations relating to the network parameters received from said network management system.

8. A device according to claim 1, wherein said management means include alarm means able to trigger the sending of an alarm and/or of information data to said network management system and/or to at least one other network element, in accordance with certain of said chosen assurance rules.

9. A device according to claim 8, wherein said alarm means are configurable.

10. A device according to claim 8, wherein said information data and said alarms are representative of the results of analyses performed by an analysis means, and/or of data aggregation, effected by said analysis means, and/or of a network parameter value stored in said management information base.

11. A device according to claim 1, wherein said management means include network observation means defining a flow measurement agent of the end-to-end type, arranged so as to determine information data which are representative of said flow of the end-to-end type in accordance with certain of said chosen assurance rules.

12. A device according to claim 11, wherein said network observation means are configurable.

13. A device according to claim 1, wherein said management means include means for the management of service level agreements or SLAs, arranged so as to determine information data representing said agreement management in accordance with certain of said chosen assurance rules.

14. A device according to claim 13, wherein said service level agreement management means are configurable.

15. A device according to claim 2, wherein said management means include monitoring means which are able to manage the operation of an analysis means, of an alarm means, of a network observation means and of the service level agreement management means, in accordance with at least some of said chosen assurance rules.

16. A device according to claim 15, wherein said monitoring means are supplied with information data by said analysis means and/or said network observation means and/or the service level agreement management means (SM4), and are arranged so as to order said alarm means to generate alarms and/or reports in the event of detecting non-compliance with an assurance rule by received the information data.

17. A device according to claim 15, wherein said monitoring means are arranged in the form of a rule engine storing said chosen assurance rules.

18. A device according to claim 15, wherein said monitoring means are configurable.

19. A device according to claim 1, wherein said management means are capable of being configured by said network management system via an application programming interface of said network element.

20. A device according to claim 1, wherein said management means are capable of being configured by said network management system via an application programming interface of said network element and via said management information base.

21. A device according to claim 19, wherein said analysis means and/or said alarm means and/or said network observation means and/or said monitoring means and/or the service level agreement management means are capable of being configured by said network management system, via said application programming interface.

22. A device according to claim 20, wherein said analysis means and/or said alarm means and/or said network observation means and/or said monitoring means and/or the service level agreement management means are capable of being configured by said network management system, via said application programming interface and via said management information base.

23. A device according to claim 1, wherein said management means are capable of being configured by said network management system using dedicated commands.

24. A device according to claim 23, wherein said analysis means and/or said alarm means and/or said network observation means and/or said service level agreement management means and/or said monitoring means are arranged so as to be capable of being configured by said network management system using dedicated commands.

25. A device according to claim 23, wherein said commands are of the "Command Line Interface" type.

26. A network element for a communication network equipped with a network management system, where said network element presents a chosen configuration and including means for the measurement of parameter values in the network and a management information base capable of storing management data representing said parameter values, wherein the network element comprises a device or arrangement (D) in accordance with claim 1.

27. A network element in accordance with claim 26, further comprising an application programming interface, and wherein said management information base is capable of being configured by said network management system via said application programming interface.

28. A network element in accordance with claim 26, further comprising an application programming interface, and wherein said management information base is capable of being programmed by said network management system via said application programming interface.

29. A network element in accordance with claim 26, wherein the network element is chosen from a group which includes at least one of routers, switches and firewalls.

30. A communication network according to claim 26, comprising a network management system, wherein the communication network comprises a plurality of different network elements comprising at least one of a server equipped with a firewall, a switch, an edge router or a core router.

31. A network in accordance with claim 30, wherein each network element is arranged to deliver alarms and/or information data of various types to said network management system.

32. A method of managing network technologies comprising:
applying a local assurance management device for a network element in a communication network equipped with a network management system,
wherein said network element presents a chosen configuration and comprises means for measuring parameter values in the network, and a built-in management information base used to store management data which are representative of said measured parameter values, and
wherein the device comprises management means which are arranged to adapt the configuration of said network element according to at least said management data stored in said management information base, and chosen rules, known as assurance rules, defining a local assurance policy, where said adaptation comprises a change to a measurement policy parameter and/or a change to a report transmission policy to said network management system.

33. A method according to claim 32, wherein said network technologies are chosen from a group which includes transmission networks, comprising at least one of a Wavelength-Division Multiplexing, a Synchronous Optical NETwork and a Synchronous Digital Hierarchy type, management networks, of the Internet-IP and Asynchronous Transfer Mode type, and speech networks, of the conventional, mobile and Next Generation Network type.

* * * * *